US010518191B2

(12) United States Patent
Hoé et al.

(10) Patent No.: US 10,518,191 B2
(45) Date of Patent: Dec. 31, 2019

(54) STRUCTURE COMPRISING TWO SHELL PARTS

(71) Applicant: LEGO A/S, Billund (DK)

(72) Inventors: Mikkel Schildknecht Hoé, Juelsminde (DK); Per Mortensen, Give (DK)

(73) Assignee: LEGO A/S (DK)

( * ) Notice: Subject to any disclaimer, the term of this patent is extended or adjusted under 35 U.S.C. 154(b) by 167 days.

(21) Appl. No.: 15/527,059

(22) PCT Filed: Dec. 1, 2015

(86) PCT No.: PCT/DK2015/050370
§ 371 (c)(1),
(2) Date: May 16, 2017

(87) PCT Pub. No.: WO2016/086940
PCT Pub. Date: Jun. 9, 2016

(65) Prior Publication Data
US 2017/0333804 A1      Nov. 23, 2017

(30) Foreign Application Priority Data

Dec. 1, 2014    (DK) .................................. 2014 70754

(51) Int. Cl.
*A63H 33/06*        (2006.01)
*F16B 7/04*         (2006.01)
(Continued)

(52) U.S. Cl.
CPC ............. *A63H 33/062* (2013.01); *A63H 3/16* (2013.01); *A63H 33/088* (2013.01); *F16B 7/042* (2013.01);
(Continued)

(58) Field of Classification Search
CPC ...... A63H 33/062; A63H 33/088; A63H 3/16; F16B 7/042; Y10T 24/45262; Y10T 403/69; Y10T 403/7073; Y10T 403/7092
(Continued)

(56) References Cited

U.S. PATENT DOCUMENTS

| 4,245,426 A | 1/1981 | Sullivan |
| 4,990,044 A | 2/1991 | Kimak |

(Continued)

FOREIGN PATENT DOCUMENTS

| CA | 1061613 A1 | 9/1979 |
| CN | 2636964 Y | 9/2004 |

(Continued)

OTHER PUBLICATIONS

DKPTO's Search Report issued in priority application No. PA 2014 70754, dated Jul. 17, 2015.

(Continued)

*Primary Examiner* — Greg Binda
(74) *Attorney, Agent, or Firm* — Day Pitney LLP

(57) ABSTRACT

A structure comprising two shell parts connected to each other with at least one snap connection, the two shell parts comprising, on the inner side, mutually complementary male and female snap means configured to form a snap connection, and complementarily configured abutment faces that abut on each other when the male and female snap means are interconnected. The male and female snap means comprise an external spiral-shaped protrusion configured on the male snap means, and a complementarily configured, internal, spiral-shaped protrusion configured on the female snap means configured to engage. The structure comprises rotation-preventive means configured such that the two shell (Continued)

parts are unable to rotate relative to each other when the male and female snap means are interconnected to form at least one snap connection.

9 Claims, 5 Drawing Sheets

(51) Int. Cl.
    *A63H 3/16*     (2006.01)
    *A63H 33/08*     (2006.01)

(52) U.S. Cl.
    CPC ........ *Y10T 24/45262* (2015.01); *Y10T 403/69* (2015.01); *Y10T 403/7073* (2015.01); *Y10T 403/7092* (2015.01)

(58) Field of Classification Search
    USPC .......................................................... 403/344
    See application file for complete search history.

(56) References Cited

U.S. PATENT DOCUMENTS

| | | | |
|---|---|---|---|
| 6,863,465 B2* | 3/2005 | Brancheriau | B62D 25/147 403/375 X |
| 2007/0270075 A1* | 11/2007 | Todokoro | A63H 3/16 |
| 2011/0041295 A1 | 2/2011 | Reiter | |

FOREIGN PATENT DOCUMENTS

| | | |
|---|---|---|
| CN | 101820962 A | 9/2010 |
| CN | 202237257 U | 5/2012 |
| DE | 20 2004 019 773 U1 | 3/2005 |
| DE | 10 2010 004 683 A1 | 7/2011 |
| DE | 102012004524 A1 | 9/2012 |
| GB | 0 855 652 A | 12/1960 |
| GB | 1 521 232 A | 8/1978 |
| GB | 2 074 461 A | 11/1981 |
| JP | S59-64188 U | 4/1984 |
| JP | 2002-306855 A | 10/2002 |
| JP | 2003-239923 A | 8/2003 |
| JP | 2010-148888 A | 7/2010 |
| WO | 2014/122155 A1 | 8/2014 |

OTHER PUBLICATIONS

International Search Report (corrected version) together with Written Opinion, issued in international application No. PCT/DK2015/050370, dated Mar. 23, 2016.
Original Notification of Reason for Refusal issued in corresponding Japanese application No. 2017-529346, dated Jul. 30, 2019.
English language translation of Notification of Reason for Refusal issued in corresponding Japanese application No. 2017-529346, dated Jul. 30, 2019.
First Office Action with Search Report issued in corresponding Chinese patent application No. CN 201580065199.9, dated Feb. 26, 2019. (English translation).

* cited by examiner

STRUCTURE COMPRISING TWO SHELL PARTS

CROSS-REFERENCE TO RELATED APPLICATIONS

This application is a U.S. National Stage of International Application No. PCT/DK2015/050370, filed on 1 Dec. 2015 and published on 9 Jun. 2016, as WO 2016/086940 A1, which claims the benefit of priority to Danish Patent Application No. PA 2014 70754, filed on 1 Dec. 2014.

The present invention relates to a structure comprising two shell parts that are connected to each other by at least one snap connection; wherein the two shell parts comprise, on the inner side, mutually complementary male and female snap means configured to form a snap connection; and wherein the two shell parts have complementarily configured abutment faces that abut on each other when the male and female snap means are interconnected.

BACKGROUND

It is commonly known to build structures from shell parts. It is also known to use snap connections in the context of interconnection of two shell parts, wherein the snap connection is constituted by two cylindrical, complementary snap means; wherein they are configured with slits longitudinally of the snap means for temporarily enabling deformation to the effect that the two complementary snap means with protrusions and recesses, respectively, are enabled to engage with one another.

However, the construction of the known snap connections bring about the need for complex tools and/or work procedures in the context of the manufacturing process, where the moulded shell parts with snap means are to be removed from the mould.

BRIEF DESCRIPTION OF THE INVENTION

It is consequently the object of the invention to provide an alternative construction for a permanent interconnection of two shell parts for forming a structure, and whereby the structure is simpler to manufacture by plastics moulding.

This is accomplished in that the male and female snap means described above comprise an external spiral-shaped protrusion configured on the male snap means and a thereto complementarily configured internal spiral-shaped protrusion configured on the female snap means; and wherein the external spiral-shaped protrusion on the male snap means is configured in such a manner that it engages with the internal spiral-shaped protrusion on the female snap means; and in that the structure comprises rotation-preventive means configured such that the two shell parts cannot rotate relative to each other when the male and female snap means are interconnected to form at least one snap connection.

According an embodiment of the invention, the structure comprises at least two snap connections whereby the two shell parts cannot rotate relative to each other when the male and female snap means are interconnected.

According to an embodiment of the invention, each of the two shell parts comprises, along their peripheries, complementarily configured abutment faces in the form of flanges or recesses, whereby the two shell parts cannot rotate relative to each other when the male and female snap means are interconnected.

According to an embodiment of the invention, the male snap means comprises a tubular protrusion having an exterior surface, wherein the external diameter of the exterior surface of the male snap means is smallest at the free end of the male snap means opposite the shell part.

According to an embodiment of the invention, the male snap means comprises an interior surface which is either a cylindrical cavity of uniform diameter or frusto-conical with smallest diameter closest to shell part and largest diameter at the free end.

According to an embodiment of the invention, the female snap means comprises complementary construction relative to the male snap means for forming a snap connection; wherein the female snap means comprises a tubular protrusion comprising an interior surface; wherein the internal diameter of the interior surface of the female snap means is smallest at the shell part and largest at the free end of the female snap means opposite the shell part. Hereby it is accomplished that the shell parts comprising snap means can be more easily separated from a plastics mould in the manufacturing process.

According to an embodiment of the invention, the female snap means comprises an exterior surface, wherein the exterior surface is either cylindrical with uniform diameter or frusto-conical with smallest diameter at the extremity of the female snap means.

According to an embodiment of the invention, the interior surface of the tubular protrusion of the female snap means comprises at least one spiral-shaped protrusion, and the exterior surface of the tubular protrusion of the male snap means comprises spiral-shaped protrusions.

According to an embodiment of the invention, the structure comprises one or more coupling means configured for interconnection with toy building elements comprising complementarily configured coupling means.

According to an embodiment of the invention, the structure is configured from plastics material and manufactured by injection moulding.

LIST OF FIGURES

An embodiment of the invention will now be explained in further detail with reference to the drawing, wherein.

DETAILED DESCRIPTION WITH REFERENCE TO THE FIGURES

Figure 1A:
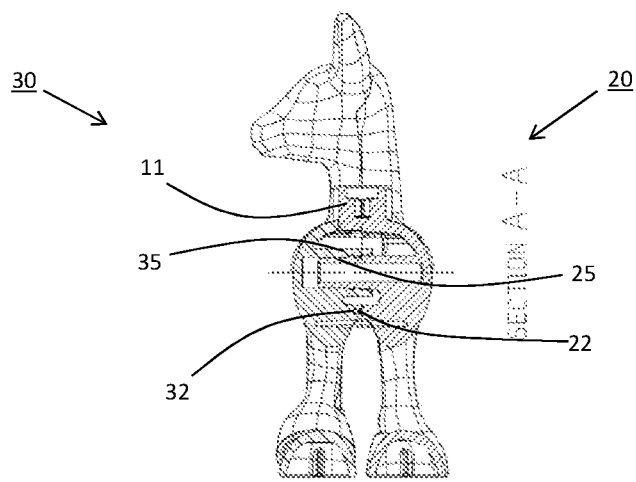
FIGS. 1A-1C illustrate a structure assembled by two shell parts, seen in a cross-sectional view, seen from above, and showing an enlarged segment thereof.
Figure 1B:
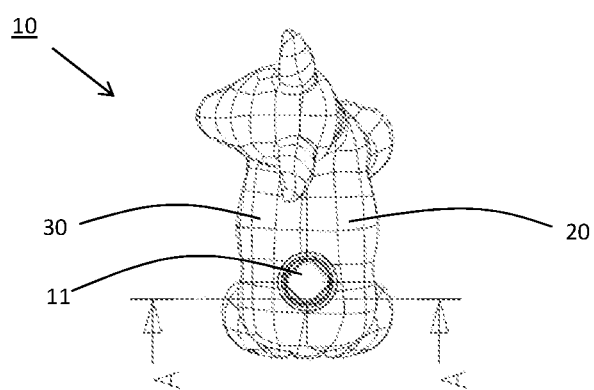
Figure 1C:
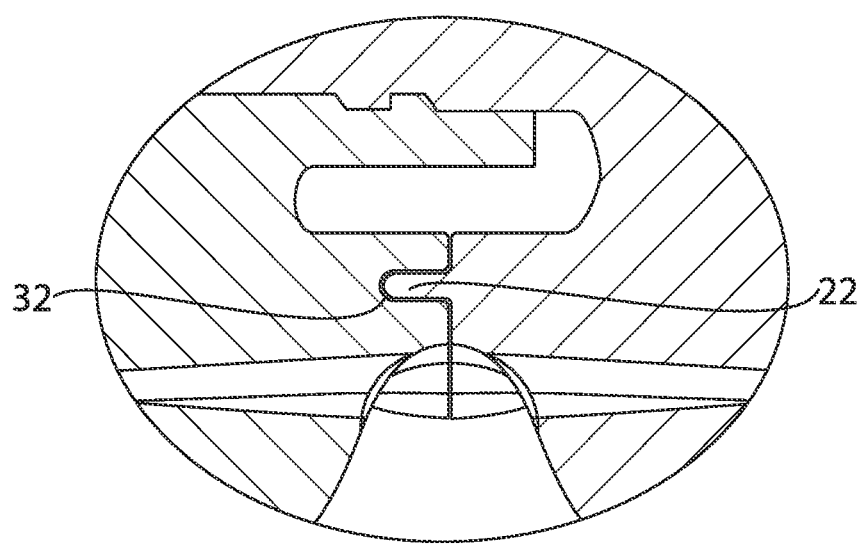

The present invention relates to a structure 10 in the form of a toy figure, which, in FIG. 1, is illustrated as an animal.

The structure (10) comprises two shell parts (20, 30) that are connected to each other by one or more snap connections. Each of the two shell parts comprises, on the inner side, complementary and tubular, respectively, male and female snap means (25, 35) that are configured to form a concealed snap connection, and wherein the two shell parts have complementarily configured abutment faces that abut on each other when the male and female snap means are interconnected (25, 35).

The snap means (25, 35) comprise one or more spiral-shaped protrusions (24, 34), whereby the two snap means are able to mesh with each other.

The spiral-shaped protrusions comprise both conically spiral-shaped protrusions and helical protrusions.

The structure (10) comprises one or more rotation-preventive means whereby the two shell parts are unable to rotate relative to each other when the male and female snap means are interconnected.

The rotation-preventive means may be in the form of the structure (10) comprising at least two snap connections (21) or the two shell parts (20, 30) each comprising, along the periphery of the shell parts, complementarily configured abutment faces in the form of flanges or recesses, as illustrated in FIG. 1, with tongue and groove (22, 32), respectively, whereby the two shell parts cannot rotate relative to each other and thereby obviates that shell parts are unintentionally separated. Thus, the structure may either comprise one or more types of rotation-preventive means in combination.

The structure (10) comprises one or more coupling means (11) configured for interconnection with toy building elements comprising complementarily configured coupling means whereby the structure may partake in playing with toy building sets.

Figure 2:
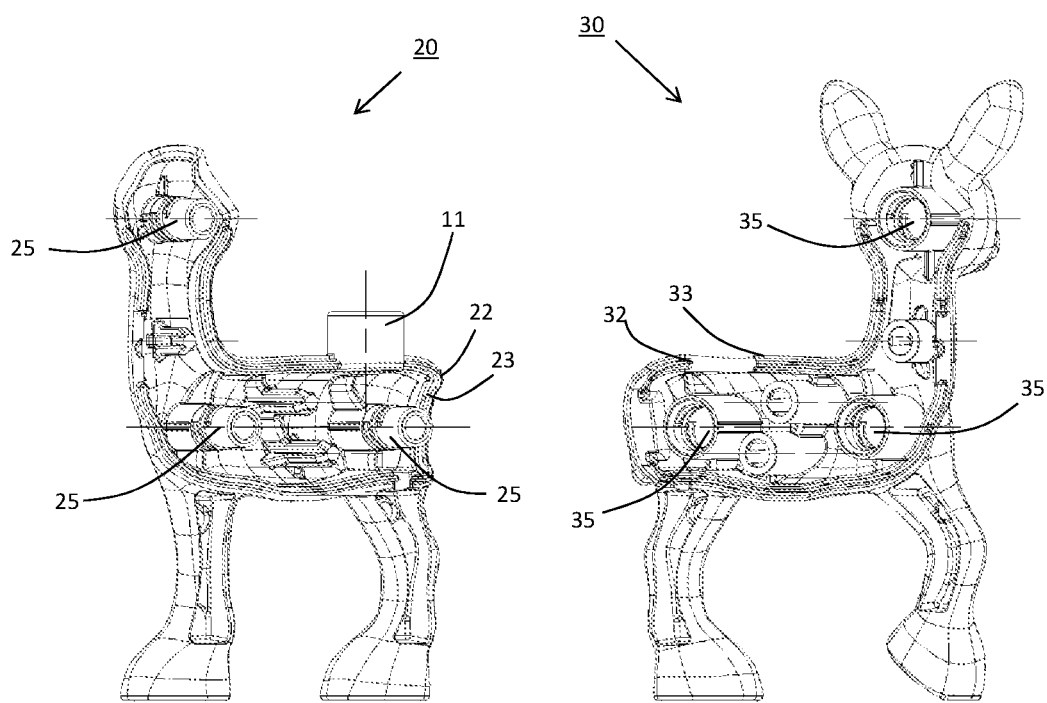
FIG. 2 illustrates, in a perspective view, two shell parts.

FIG. 2 shows the two shell parts (20, 30). The first shell part (20) comprises three male snap means (25) that are arranged on the inner side of the shell part and a coupling means (11) which is arranged on the outer side of the shell part. Correspondingly the second shell part (30) is shown comprising three female snap means (35) that are configured for receiving the male snap means (25) on the first shell part.

The two types of snap means are tubular, and the male snap means (25) illustrated with a threaded protrusion on the external cylindrical surface, said threaded protrusion consisting of one long groove that sits like a helix on the surface of the cylinder like eg on a bolt. The female snap means is complementarily configured with a thread on the inner side of the cylindrical hole, like on a nut having an interior thread.

Figure 3:
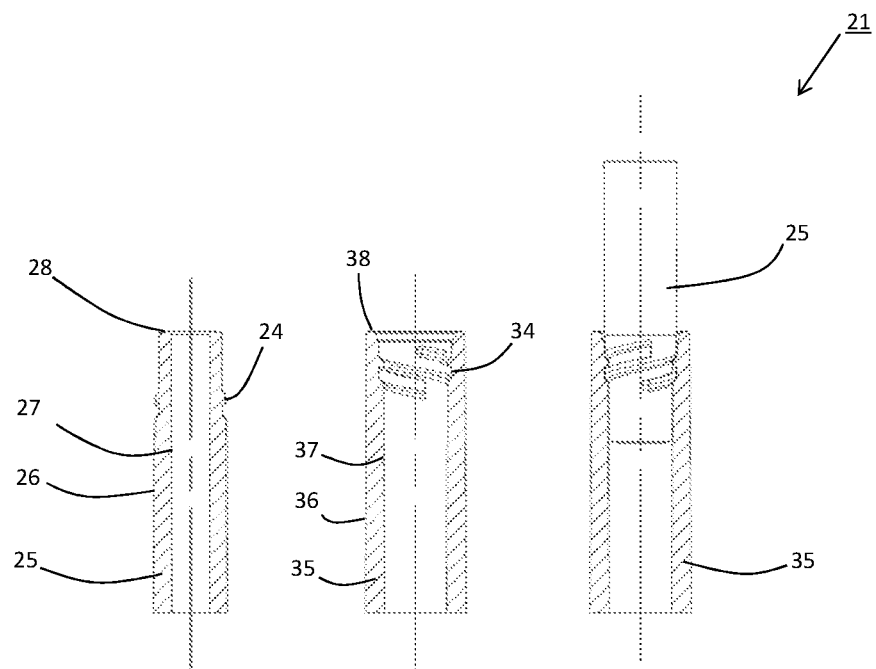
FIG. 3 illustrates male and female snap means and a snap connection, seen in a lateral view.
Figure 4:
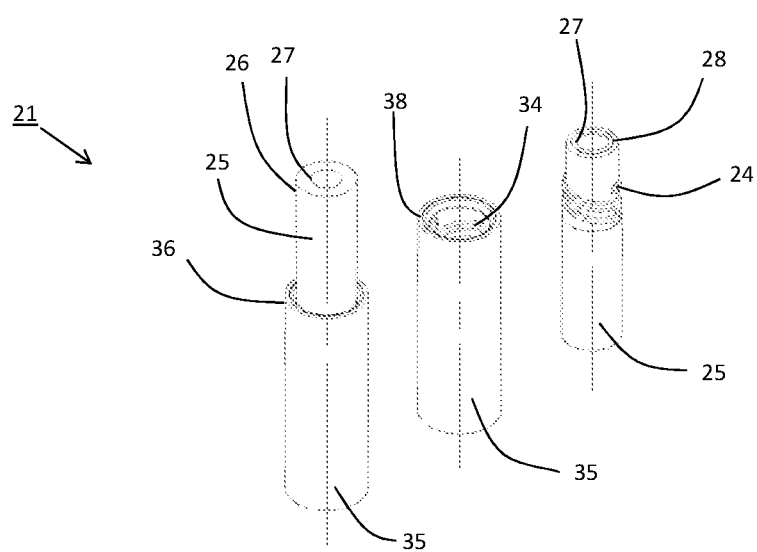
FIG. 4 illustrates, in a perspective view, a snap connection and a female snap means and a male snap means.

Moreover, the constructions of the snap connection (21) and the two snap means (25, 35) are further shown in FIGS. 3 and 4, respectively.

The male snap means (25) comprises an exterior surface (26) and a cylindrical interior surface (27) and a free end (28). On the exterior surface (26) of the male snap means (25), a spiral-shaped protrusion (24) is arranged at the free end (28).

The female snap means (35) also comprises a cylindrical exterior surface (36) and an interior surface (37) and a free end (38). The female snap means (35) is configured with at least one spiral-shaped protrusion (34) on the interior surface (37) of the tubular female snap means (35) that creates a groove corresponding to the complementary configuration of the at least one spiral-shaped protrusion (24) on the exterior surface (26) of the male snap means (25). The spiral-shaped protrusion extends two rounds in the shown embodiment.

In FIGS. 3 and 4, the two tubular snap means, the female snap means (35) and the male snap means (25), respectively, are shown separate and interconnected to form a snap connection (21).

The exterior surface of the male snap means (25) is configured such that the largest diameter of the exterior surface is positioned at the shell part (20) opposite the free end (28), whereas the outer diameter of male snap means (25) is smallest at the free end (28). Likewise, the interior surface of the female snap means (35) is configured such that the smallest diameter is positioned at the shell part (30), and wherein the internal diameter of the female snap means (35) is largest at the free end (38) of the female snap means (35).

The tubular male snap means (25) comprises a cylindrical cavity formed by the interior surface (27). The configuration of that cavity is illustrated as a frusto-conical cavity with smallest diameter closest to shell part (20) and largest diameter at the free end (28).

The exterior surface (36) of the female snap means (35) is illustrated in FIG. 3 with a cylindrical, uniform diameter. According to a further embodiment, the exterior surface (36) of the female snap means is frusto-conical with the smallest diameter at the free end (38) of the female snap means (35).

What is claimed is:

1. A toy figure comprising:
   two shell parts which are connected to each other with at least one snap connection;
   wherein the two shell parts each comprise, on an inner side thereof, mutually complementary male and female snap means configured to form a snap connection;
   wherein the two shell parts have complementarily configured abutment faces along their peripheries that abut on each other when the male and female snap means are interconnected;
   wherein the male and female snap means comprise-an external spiral-shaped protrusion configured on the male snap means and a thereto complementarily configured, internal, spiral-shaped protrusion configured on the female snap means, whereby the external spiral-shaped protrusion and the internal spiral-shaped protrusion are configured to engage when the male and female snap means are interconnected; and
   wherein the toy figure comprises rotation-preventive means configured such that the two shell parts are unable to rotate relative to each other when the male and female snap means are interconnected to form at least one snap connection.

2. The toy figure according to claim 1, wherein the rotation-preventive means comprises at least two snap connections.

3. The toy figure according to claim 1, wherein the complementarily configured abutment faces on each of the two shell parts are flanges or recesses to the effect that the two shell parts cannot rotate relative to each other when the male and female snap means are interconnected.

4. The toy figure according to claim 1, wherein the male snap means comprises a tubular protrusion with an exterior surface, wherein the external diameter of the exterior surface of the male snap means is smallest at the free end of the male snap means opposite the shell part to which it is connected.

5. The toy figure according to claim 1, wherein the male snap means comprises an interior surface which is a cylindrical cavity of uniform diameter.

6. The toy figure according to claim 1:
   wherein the female snap means comprises complementary construction relative to the male snap means for forming a snap connection;
   wherein the female snap means comprises a tubular protrusion comprising an interior surface; and
   wherein the internal diameter of the interior surface of the female snap means is smallest at the shell part to which it is connected and largest at the free end of the female snap means opposite the shell part.

7. The toy figure according to claim 1, wherein the female snap means comprises an exterior surface which is cylindrical with uniform diameter.

8. The toy figure according to claim 1, wherein the female snap means comprises a tubular protrusion such that the spiral-shaped protrusion on the female snap means is formed on an interior surface of the tubular protrusion, and wherein the male snap means comprises a tubular protrusion such that the spiral-shaped protrusion on the male snap means is formed on an exterior surface of the tubular protrusion of the male snap means.

9. The toy figure according to claim 1, wherein the toy figure is made by injection moulding.

\* \* \* \* \*